United States Patent
Stiefel et al.

[11] 3,865,297
[45] Feb. 11, 1975

[54] AUTOMATIC CHARGE FEEDER

[75] Inventors: Richard Stiefel, Weehawken; Charles G. Krumm, Wyckoff, both of N.J.

[73] Assignee: Kahle Engineering Co., Union City, N.J.

[22] Filed: Mar. 14, 1973

[21] Appl. No.: 341,316

[52] U.S. Cl. ............... 228/11, 221/96, 221/264, 228/41, 228/56
[51] Int. Cl. ............... B23k 1/00, B23k 5/00
[58] Field of Search ............... 228/11, 41, 56, 56.5; 221/12, 264, 268, 276, 96

[56] References Cited
UNITED STATES PATENTS

| | | | |
|---|---|---|---|
| 1,104,261 | 7/1914 | Hausheer | 228/41 |
| 2,175,100 | 10/1939 | Albert | 228/41 |
| 2,685,268 | 8/1954 | Yeo et al. | 228/11 |
| 3,339,799 | 9/1967 | Spisak | 221/264 X |

*Primary Examiner*—Francis S. Husar
*Assistant Examiner*—Robert J. Craig
*Attorney, Agent, or Firm*—Holland, Armstrong, Wilkie & Previto

[57] ABSTRACT

An improved automatic feeder is described for use in soldering, brazing, or similar operations for supplying the fastening or coupling alloy. The alloy is provided in the form of small balls or other charges and the device automatically directs these charges to predetermined positions on the articles being soldered or brazed as the articles are presented on a conveyor or otherwise to the feeder. In one form of the feeder, the alloy feed is combined with a cooperating flux dispensing device for providing a coordinated automatic fluxing and charge feeding operation.

11 Claims, 6 Drawing Figures

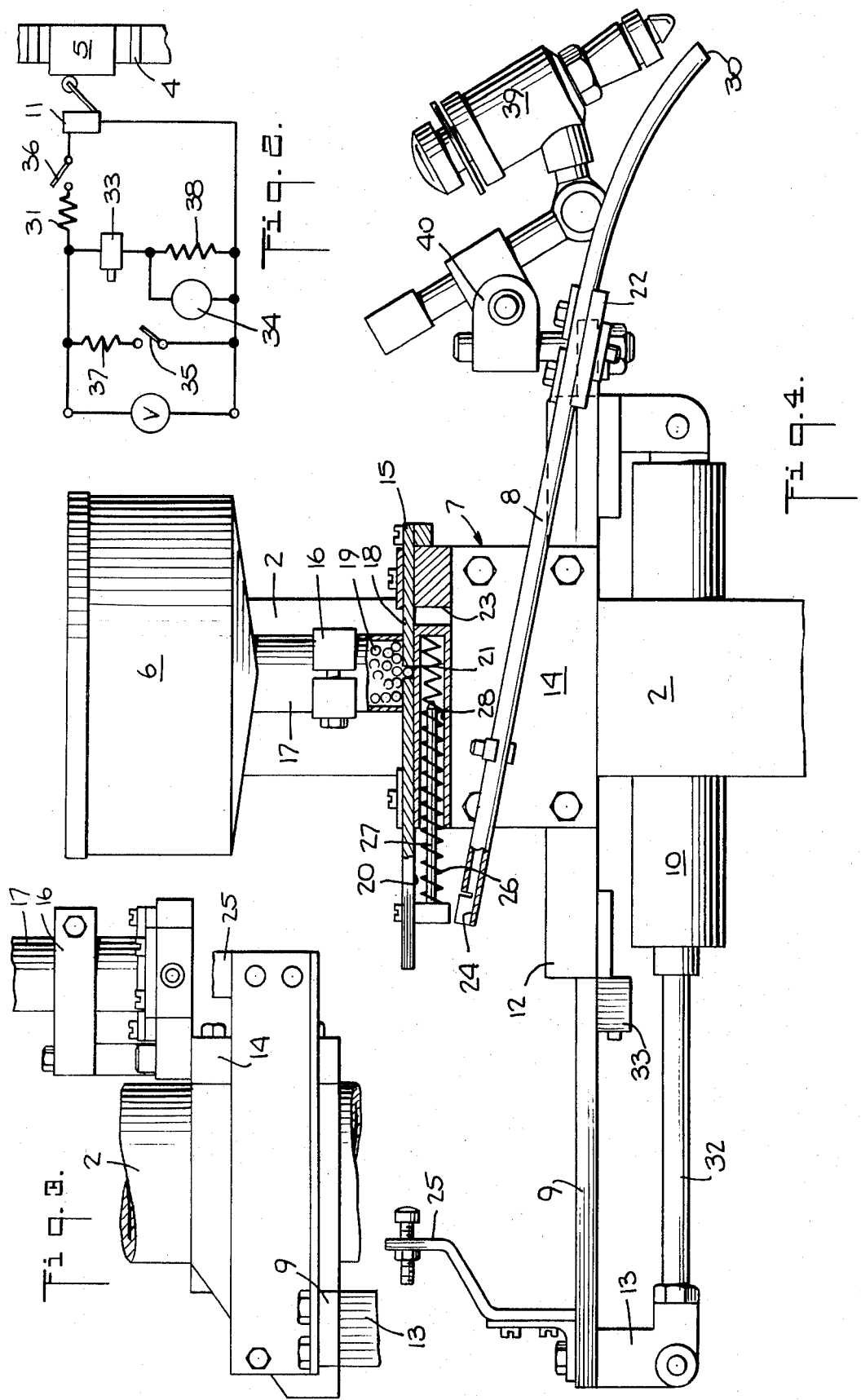

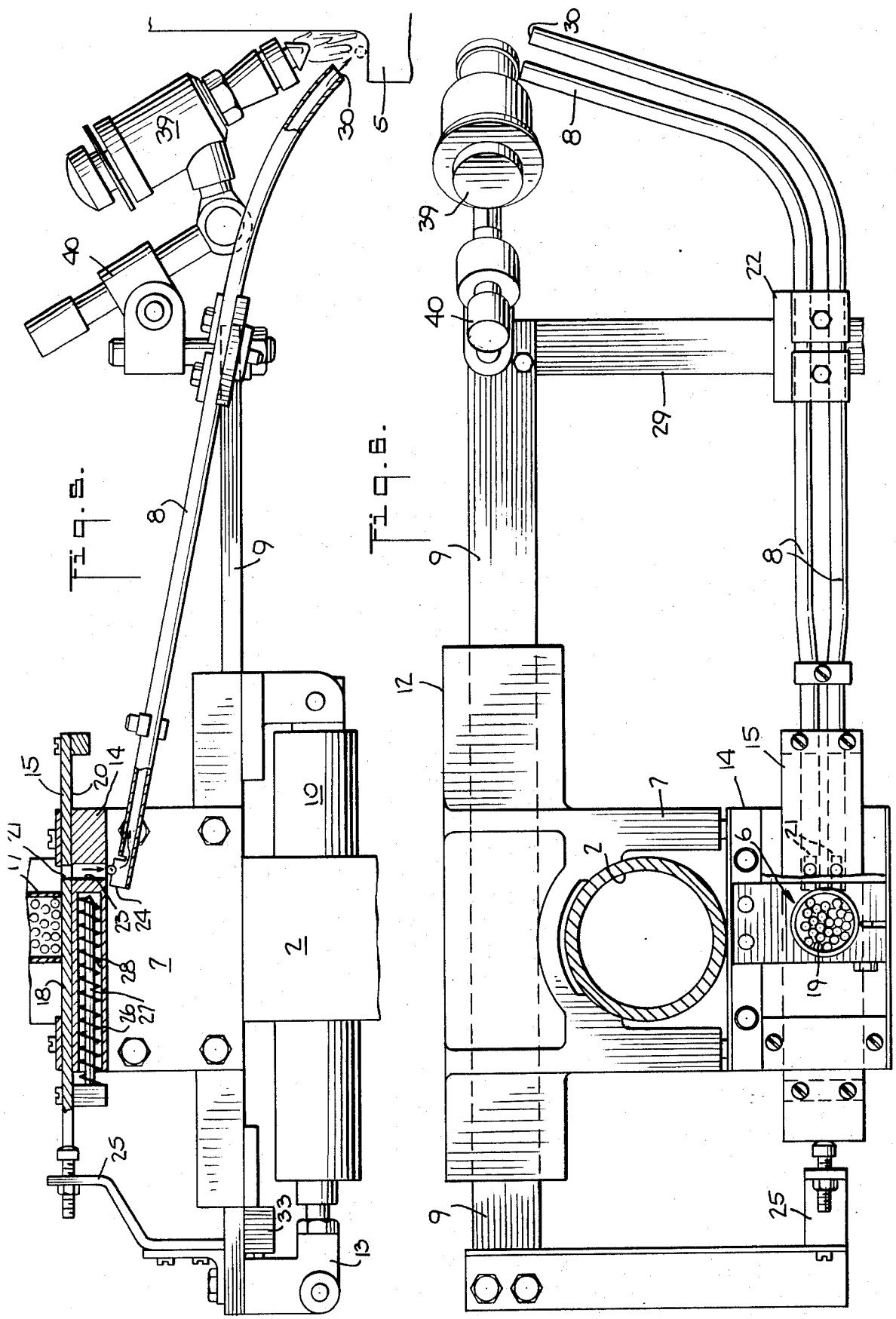

AUTOMATIC CHARGE FEEDER

BACKGROUND OF THE INVENTION

The present invention relates to the fastening art such as soldering or brazing and more particularly to means for automatically feeding a charge such as a soldering or brazing alloy to the fastening point. In particular, an automatic charge feeding device is provided for use with an automatic or a semi-automatic fastening system.

There are an increasing number of automated manufacturing operations which require fastening operations for metallic articles such as soldering or brazing operations. In order to perform these operations at high speeds which are comparable to those of other automatic processing operations on the same articles, it is desirable that the fastening operations be performed at high speed and in an automatic manner. Additionally, it is desirable that these coupling operations be performed in an efficient and effective manner at a precisely positioned location on the article and with a carefully controlled quantity of the soldering or brazing charge being used to eliminate waste and to give an improved appearance with little or no cleaning or polishing. It is also desirable that the automatic charge feeding device be suitable for use with a variety of articles of differing shapes and sizes. This capability requires an automatic feeder which is readily adjustable for depositing the necessary coupling charges at predetermined positions on the articles and where the adjustment permit the charges to be placed on differing portions of articles of differing shapes and sizes. This automatic feed of a charge of predetermined size reduces the human factor in fastening operations thereby minimizing undesirable variations particularly where the feeder for the alloy charge is operated in combination with a cooperating automatic flux feeding device.

Accordingly, an object of the present invention is to provide an improved automatic feeder for fastening operations such as soldering or brazing operations.

Another object of the present invention is to provide an automatic charge feeder for use in an automatic article processing line using straight, curved, or circular conveyors or turrets or other article handling means.

Another object of the present invention is to provide an automatic charge feeder for feeding charges of predetermined volume to a fastening position.

Another object of the present invention is to provide a reliable and relatively simple automatic charge feeder for soldering and brazing operations.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 2 is a schematic of a control system.

FIG. 3 is an end view of the feeder.

FIG. 4 is an enlarged detailed side elevational view of the feeder.

FIG. 5 is a side elevational view corresponding to FIG. 4 illustrating the feeder in its forward or feeding position.

FIG. 6 is a top plan view of the feeder device.

DESCRIPTION OF THE PREFERRED EMBODIMENT

Figure 1:
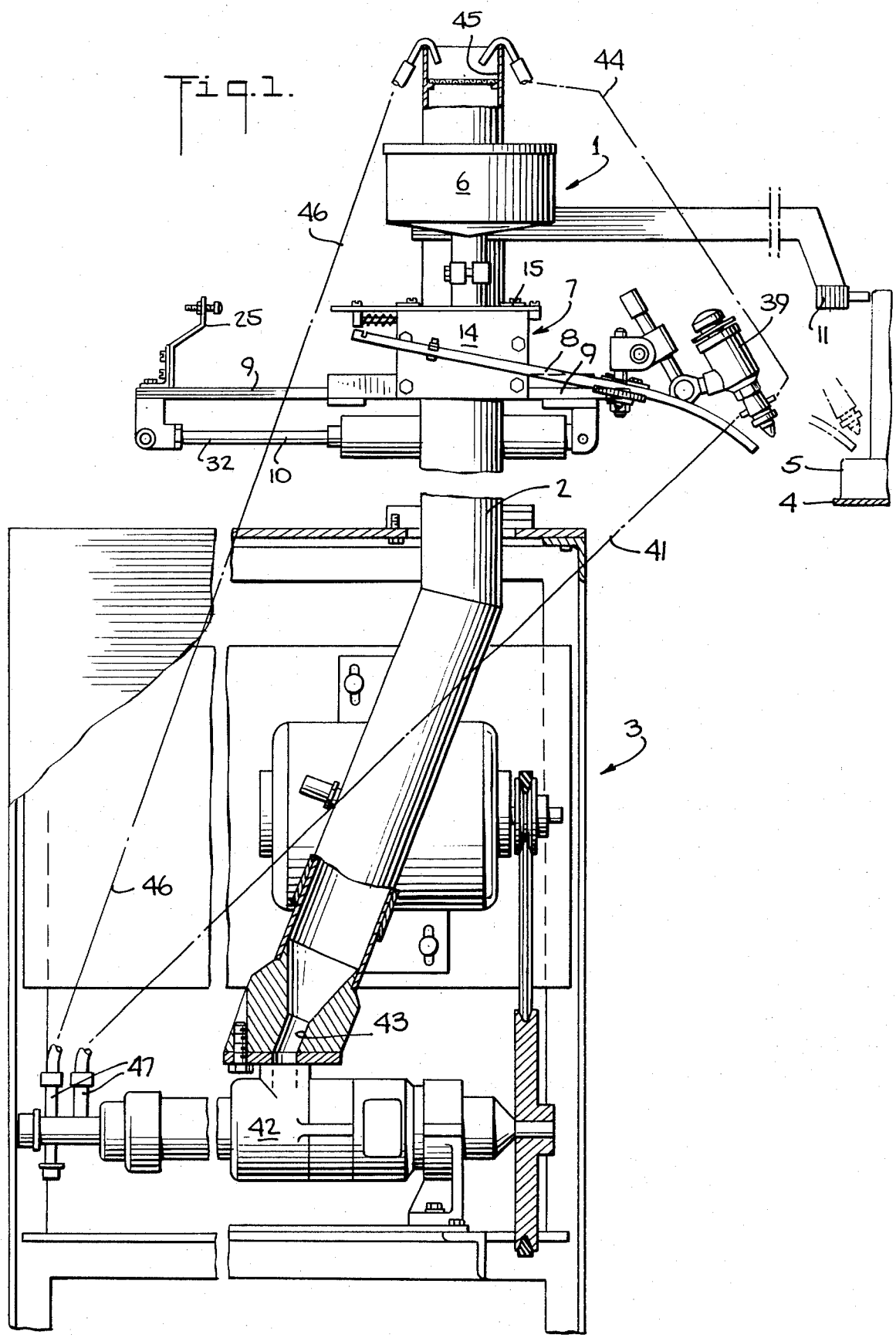
FIG. 1 is a side elevational view illustrating a feeder device in accordance with the invention mounted in a typical operating position with a cooperating flux dispensing means.

A preferred embodiment of the feeder device will now be described wherein the soldering or brazing alloy or charge is in the form of small balls. It is clear that a similar feeding action may be provided with pellets of differing shape where the pellets may move by gravity force through a distributing system as described below.

The automatic feeder of the present invention may operate independently of a fluxing device or it may also operate in cooperation with a fluxing device in a manner which will be further described below.

The preferred form of the soldering or brazing alloy or other charge for use with the feeder is ball-shaped so that a rolling action may be taken advantage of in the feeding operation. The ball shape also provides a uniform cross-section for the charge regardless of its position as it passes through the feeding device and is positioned on the article being fastened.

The improved feeder will first be described in a general way with particular reference to FIG. 1. The feeder 1 as illustrated in FIG. 1 is mounted on a generally vertical support member 2 which extends upwardly from a suitable base or cabinet 3. The particular support 2 illustrated in FIG. 1 is a flux reservoir which will be described more fully below; however, any suitable support member capable of mounting the feeder 1 at a feeding station may be utilized. The feeder support 2 is positioned adjacent to a conveyor, such as an intermittently driven conveyor belt 4, which presents the articles 5 to be fastened to the alloy feeding station 1.

The feeder 1 comprises a reservoir 6 for storing the charges of the fastening alloy. The reservoir 6 is mounted on a suitable clamp or other support 7 which also mounts a number of charge feed tubes 8 for carrying the charges to the fastening point. The tubes 8 which receive the charges from the reservoir 6 are mounted on a movable slide arm 9. The slide arm 9 is movably mounted on the support 7 and is driven to and from the feeding position adjacent to the articles 5 being fastened by means of a drive motor, such as the air cylinder 10.

The feeder 1 includes a sensing means 11 which detects the arrival of an article 5 at the feeder 1 and which initiates the feeding action of the feeder 1.

The details of a preferred embodiment of the feeder 1 are illustrated in FIGS. 3 through 6 which show the feeder support member 7, such as a clamp, adjustably positioned on the support 2. An elongated bearing 12 is provided at one side of the support 7 for slidably mounting the reciprocating slide arm 9. The air cylinder 10 mounted on the bearing 12 is coupled to the slide arm at bracket 13 for moving the slide arm 9 to and from its feeding position. A support flange 14 is attached to the opposite side of the support 7. The reservoir 6 and a cooperating charge feed plate 15 are mounted on the top of the flange 14. As best seen in FIG. 3, a clamp 16 attached to the flange 14 supports a generally cylindrical lower feed 17 section of the reservoir 6. The hollow lower feed section 17 is in communication with the enlarged upper storage section of the reservoir 6 and is in communication with the charge feed plate 15 at its open bottom.

The charge feed plate 15 is slidably mounted on the flange 14 with the upper surface 18 of the plate 15 engaging balls or other charges 19 in the reservoir 6 and with its lower surface 20 in sliding engagement with the support flange 14. A number of feed slots 21 are provided in the charge feed plate 15 with one slot 21 being provided for each of the charge feeding tubes 8. In the embodiment illustrated in FIG. 6, for example, two slots 21 are provided which correspond to the two feed tubes 8. The feed tubes 8 are attached to an adjustable clamp 22 on the forward end of the slide arm 9 so that the tubes 8 are moved to a predetermined position with respect to the article 5 being fastened during the feeding action. The flange 14 has an aperture 23 provided therein for each feed tube 8. One aperture 23 is positioned to feed charges into the open end 24 of each of the feed tubes 8 when the tubes 8 have been moved to their feeding position as illustrated in FIG. 5. The slidably mounted feed plate 15 has its slots 21 positioned so that charges 19 are carried from the reservoir 6 to the feed apertures 23 during the feeding operation when a pusher arm 25 mounted on the slide arm 9 moves the feed plate 15 in the manner illustrated in FIG. 6. This movement of the plate 15 is seen to carry one charge in each slot 21 to each feed aperture 23 so that the charges 19 then roll or slide down the feed tubes to the articles being fastened. A coil spring 26 compressed between a pin 27 on the slide plate 15 and an aperture 28 in the flange 14 urges the slide plate 15 towards its charge loading position when the slide arm 9 moves away from the conveyor 4 as illustrated in FIG. 4.

The charge feeding tubes 8 are supported by the clamp 22 at the end of a mounting arm 29 and the tubes 8 may be pre-positioned by an adjustment of the clamp 22 or arm 29 to carry the charges 19 to desired positions on the articles 5 being fastened. In addition, the feed tubes 8 may be formed of relatively soft material, such as copper, to permit them to be bent as necessary to position their discharge openings 30 at the desired point adjacent to the article 5 being fastened.

FIG. 2 illustrates a suitable circuit for providing an automatic movement of the slide arm 9 to and from the charge feeding position. Other circuits, such as the control circuit of the above-described issued patent, may be used. FIG. 2 illustrates a control solenoid 31 for an air cylinder 10 control valve coupled across a source of voltage through the detecting switch 11. When an article 5 reaches the charge feeding position, it closes the switch 11 energizing the solenoid 31 to cause the piston arm 32 of air cylinder 10 to move to the right to carry the ball feeding tubes 8 to the feeding position. A second switch 33 is closed when the slide 9 reaches the feeding position. The switch 33 initiates the operation of a timer 34 which, after a pre-set time interval, closes its contacts 35 and opens its contacts 36. The contacts 36 open the feed solenoid coil 31 while the contacts 35 couple a return valve solenoid 37 to the voltage source causing the air cylinder 10 piston to return to its extended or rest position as shown in FIG. 4. A control solenoid 38 for a flux spray nozzle 39 may be activated by the closing of the switch 33 to provide for a discharge of a predetermined quantity of flux while the slide arm 9 remains at its feeding position where a related flux spray is being used.

It is clear that the above-described automatic charge feeder 1 may be used to feed alloy charges 19 independently of other operations including a fluxing operation. However, a flux spraying means including the nozzle 39 may be advantageously incorporated into the above-described structure so that the flux and fastening alloy may be simultaneously applied to the articles 5 being fastened. In this embodiment, the flux spraying nozzle 39 is mounted on an adjustable support 40 at the end of the slide arm 9. The nozzle 39 is positioned to direct the flux to a predetermined point on the article 5 when the slide arm 9 is in its charge feeding position as illustrated in FIG. 5. When this embodiment is used, the feeder support column 2 may advantageously comprise a hollow flux reservoir. FIG. 1 illustrates the hollow column 2 acting as such a flux reservoir. The flux is contained in the column 2 and is fed to the nozzle 39 by a conduit 41 carrying flux from a pump 42 coupled to the bottom outlet 43 of the reservoir. This conduit system preferably feeds a continuous supply of flux to and through the nozzle 39 by means of a conduit 44 which connects the nozzle 39 to the open upper end 45 of the reservoir. An additional conduit 46 is illustrated which connects the pump outlet 47 directly to the top 45 of the reservoir to further insure a continuous circulation of the flux causing it to be kept at a desirable viscosity and temperature.

It will be seen that an improved automatic fastening device has been described for feeding alloy charges, such as are used in soldering or brazing operations, to the articles being fastened. A high speed and accurate alloy feed is provided for incorporation into an automatic article manufacturing line. The feed as disclosed is useful with a large variety of articles of differing shapes and it feeds precisely measured and positioned charges which eliminates undesirable variations including those caused by human error in brazing or soldering or other fastening operations.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An automatic charge feeder for feeding discrete charges onto an article in an article fastening system comprising the combination of:

a reservoir for the charges, an elongated charge feed tube positioned below said reservoir having a charge receiving aperture at one end and a charge dispensing outlet at the other end, a movable mounting for said tube, drive means coupled to said mounting for moving said feed tube from a first position to a second extended feeding position with the charge receiving aperture at said reservoir and the dispensing aperture adjacent to an article and at a lower level than said charge receiving aperture, means for directing a charge from the reservoir into the receiving aperture of the feed tube while the tube is at the extended position, control means for said drive means, and said control means comprising a sensor for detecting the arrival of an article at the charge feeder.

2. The charge feeder as claimed in claim 1 which further comprises an additional charge feed tube supported on said mounting adjacent said first named feed tube.

3. The charge feeder as claimed in claim 1 in which said charges comprise balls and said feed tube has a circular cross-section.

4. An automatic charge feeder for feeding discrete ball charges onto an article in an article fastening system comprising the combination of:
a reservoir for the charges,
an elongated charge feed tube of circular cross-section positioned below said reservoir having a charge receiving aperture at one end and a charge dispensing outlet at its other end,
a movable mounting for said tube,
drive means operatively coupled to said tube for moving said tube from a first position to a second extended feeding position with the charge receiving aperture at said reservoir and the dispensing aperture adjacent to an article and at a lower level than said charge receiving aperture,
means for directing a ball charge from the reservoir into the receiving aperture of the tube while the tube is at the extended position whereby the ball charge rolls to the dispensing outlet,
control means for said drive means, and
said control means comprising a sensor for detecting the arrival of an article at the charge feeder.

5. The charge feeder as claimed in claim 4 which further comprises an additioinal ball charge feed tube supported on said mounting adjacent said first named feed tube.

6. An automatic charge feeder for feeding discrete charges onto an article in an article fastening system comprising the combination of:
a reservoir for the charges,
an elongated charge feed tube positioned below said reservoir having a charge receiving aperture at one end and a charge dispensing outlet at the other end,
a movable mounting for said tube,
drive means coupled to said mounting for moving said feed tube from a first position to a second extended feeding position with the charge receiving aperture at said reservoir and the dispensing aperture adjacent to an article and at a lower level than said charge receiving aperture,
means for directing a charge from the reservoir into the receiving aperture of the feed tube while the tube is at the extended position,
control means for said drive means,
a flux spray nozzle mounted on said movable mounting,
a flux reservoir, and
conduit means coupling said flux spray to said reservoir.

7. An automatic charge feeder for feeding discrete charges onto an article in an article fastening system comprising the combination of:
a reservoir for the charges,
an elongated charge feed tube positioned below said reservoir having a charge receiving aperture at one end and a charge dispensing outlet at the other end,
a movable mounting for said tube,
drive means coupled to said mounting for moving said feed tube from a first position to a second extended feeding position with the charge receiving aperture at said reservoir and the dispensing aperture adjacent to an article and at a lower level than said charge receiving aperture,
means for directing a charge from the reservoir into the receiving aperture of the feed tube while the tube is at the extended position,
control means for said drive means,
said means for directing the charges to the feed tube comprising a slide member having its upper surface in communication with the bottom of said reservoir,
means for slidably mounting said slide member for movement between a charge receiving position and a charge dispensing position,
a slot in said slide member positioned below said reservoir for receiving a charge when said slide member is in the charge receiving position and for dispensing said charge into the charge receiving aperture of the feed tube when the slide member has been moved to the charge dispensing position, and
means for moving said slide member between said positions.

8. The charge feeder as claimed in claim 7 which further comprises spring means for urging said slide member towards its charge receiving position, and a push rod on said movable mounting for engaging said slide member for moving it towards its charge dispensing position against the force of said spring.

9. An automatic charge feeder for feeding discrete ball charges onto an article in an article fastening system comprising the combination of:
a reservoir for the charges,
an elongated charge feed tube of circular cross-section positioned below said reservoir having a charge receiving aperture at one end and a charge dispensing outlet at its other end,
a movable mounting for said tube,
drive means operatively coupled to said tube for moving said tube from a first position to a second extended feeding position with the charge receiving aperture at said reservoir and the dispensing aperture adjacent to an article and at a lower level than said charge receiving aperture,
means for directing a ball charge from the reservoir into the receiving aperture of the tube while the tube is at the extended position whereby the ball charge rolls to the dispensing outlet,
control means for said drive means,
a flux spray nozzle mounted on said movable mounting,
a flux reservoir, and
conduit means coupling said flux spray to said reservoir.

10. An automatic charge feeder for feeding discrete ball charges onto an article in an article fastening system comprising the combination of:
a reservoir for the charges,
an elongated charge feed tube of circular cross-section positioned below said reservoir having a charge receiving aperture at one end and a charge dispensing outlet at its other end,
a movable mounting for said tube,
drive means operatively coupled to said tube for moving said tube from a first position to a second extended feeding position with the charge receiving aperture at said reservoir and the dispensing aperture adjacent to an article and at a lower level than said charge receiving aperture, means for directing a ball charge from the reservoir into the receiving aperture of the tube while the tube is at the extended position whereby the ball charge rolls to the dispensing outlet, control means for said drive means, said means for directing the charges to the feed tube comprising a slide member having its upper surface in communication with the bottom of said reservoir, means for slidably mounting said slide member for movement between a charge receiving position and a charge dispensing position, a slot in said slide member positioned below said reservoir for receiving a charge when said slide member is in the charge receiving position and for dispensing said charge into the charge receiving aperture of the feed tube when the slide member has been moved to the charge dispensing position, and means for moving said slide member between said positions.

11. The charge feeder as claimed in claim 10 which further comprises spring means for urging said slide member towards its charge receiving position, and a push rod on said movable mounting for engaging said slide member for moving it towards its charge dispensing position against the force of said spring.

* * * * *